US008683778B2

(12) United States Patent
Lingle (10) Patent No.: US 8,683,778 B2
(45) Date of Patent: Apr. 1, 2014

(54) TURF CONDITIONING METHOD AND APPARATUS

(75) Inventor: Rodney Lingle, Olive Branch, MS (US)

(73) Assignee: GreensPerfection LLC, Olive Branch, MS (US)

( * ) Notice: Subject to any disclaimer, the term of this patent is extended or adjusted under 35 U.S.C. 154(b) by 299 days.

(21) Appl. No.: 13/071,268

(22) Filed: Mar. 24, 2011

(65) Prior Publication Data

US 2011/0232253 A1    Sep. 29, 2011

Related U.S. Application Data

(60) Provisional application No. 61/317,015, filed on Mar. 24, 2010.

(51) Int. Cl.
*A01D 34/53*    (2006.01)

(52) U.S. Cl.
USPC ........................................ 56/249; 56/DIG. 12

(58) Field of Classification Search
USPC .............. 56/249, 294, 7, 14.4, 156, 198, 234, 56/DIG. 12, DIG. 20; 15/179; 492/28, 30
See application file for complete search history.

(56) References Cited

U.S. PATENT DOCUMENTS

| | | | | | |
|---|---|---|---|---|---|
| 648,600 | A | * | 5/1900 | Stair | 56/259 |
| 1,167,051 | A | * | 1/1916 | Doak | 15/55 |
| 1,379,555 | A | * | 5/1921 | Goodfellow | 56/249 |
| 2,209,309 | A | * | 7/1940 | George | 56/16.9 |
| 2,879,534 | A | * | 3/1959 | Swanson et al. | 15/179 |
| 3,783,592 | A | * | 1/1974 | Schraut | 56/13.3 |
| 3,808,627 | A | * | 5/1974 | Doering et al. | 15/83 |
| 3,946,543 | A | * | 3/1976 | Templeton | 56/10.9 |
| 4,021,996 | A | * | 5/1977 | Bartlett et al. | 56/7 |
| 4,422,202 | A | * | 12/1983 | Malvasio | 15/106 |
| 4,481,757 | A | * | 11/1984 | Tsuchiya | 56/16.9 |
| 4,878,340 | A | * | 11/1989 | Roy et al. | 56/249 |
| 5,228,277 | A | * | 7/1993 | Smith et al. | 56/16.9 |
| 5,455,979 | A | * | 10/1995 | Bores et al. | 15/179 |
| 5,515,568 | A | * | 5/1996 | Larson et al. | 15/50.3 |
| 6,286,169 | B1 | * | 9/2001 | D'Costa et al. | 15/52.1 |
| 6,449,793 | B2 | * | 9/2002 | D'Costa et al. | 15/52.1 |
| 6,688,094 | B2 | * | 2/2004 | Berndt et al. | 56/249 |
| 6,945,021 | B2 | * | 9/2005 | Michel | 56/249 |
| 2005/0252184 | A1 | * | 11/2005 | Craig | 56/7 |
| 2009/0249761 | A1 | * | 10/2009 | Rinholm et al. | 56/249 |

* cited by examiner

*Primary Examiner* — Thomas B Will
*Assistant Examiner* — Joan D Misa
(74) *Attorney, Agent, or Firm* — Baker Donelson Bearman Caldwell & Berkowitz, P.C.

(57) ABSTRACT

Powered turf conditioning brushes having increased efficiency, improved lift, and which minimize the introduction of grain, and their method of use with reel mower cutting units such as those used for precision mowing of golf course greens. Various embodiments are disclosed.

20 Claims, 6 Drawing Sheets

TURF CONDITIONING METHOD AND APPARATUS

BACKGROUND OF THE INVENTION

Proper grooming of golf course greens seeks to maintain consistent playability of the grass surface, and to eliminate "grain," texture in the green that can bias the roll of the golf ball. If the leaves of grass in the green are oriented in a particular direction, such as can naturally occur in response to the direction of sunlight, balls hit in the direction the grass is leaning, or "with the grain," face less resistance to their rolling than balls hit in the reverse direction, or "against the grain." Grooming the grass in the green to stand straight involves maintaining precise cutting height and reducing to the greatest extent any factors which would introduce a non-vertical orientation of the grass leaves.

The design of modern reel mower cutting units utilizes a powered reel of several helical blades which rotate in close contact with a fixed bedknife to clip the grass leaves to a uniform height in a scissorlike fashion. The number of blades in a cutting reel varies, with more blades providing a greater "clip frequency" over a given distance of the reel mower cutting unit's forward travel. The cutting reel and bedknife are generally mounted between two ground-contacting rollers in a frame that permits the height of cut to be adjusted precisely. In walk-behind reel mowers, the rear roller, also called the traction roller, is powered, and the front roller is generally used to adjust the cutting height. In current walk-behind designs, the cutting reel is either mechanically linked to the engine and drivetrain powering the rear traction roller, or is powered by an electric motor which permits the clip frequency of the cutting reel to be set independent of the engine's throttle setting and speed of ground travel, an arrangement termed a "hybrid" drive.

In ride-on reel mowers, one or more powered helical reel cutting units is pushed or pulled across the grass surface by a tractor, with each cutting unit mounted on its own ground-contacting rollers in a manner that permits the cutting units to individually adjust to the contours of the ground. Hybrid drive systems are also available for the cutting units of ride-on reel mowers.

Powered rotating brushes are known which may be used to keep the ground-contacting rollers of the reel mower free of grass clippings, which could otherwise adhere to the rollers and change their effective diameter, resulting in a change in the height of the cut. For example, uneven cutting could result from clumps of grass clippings adhering to the rollers, producing "bumpy" or "washboard" greens.

It is also known in the art to provide a mechanical means for conditioning the grass leaves prior to cutting, generally through the use of a rotating powered brush or set of rotating vertical dethatching blades located between the front roller of a reel mower cutting unit and the helical cutting reel. Many reel mower cutting units have a groomer drive accessory configured to power such turf conditioning attachments. Such conditioning means are intended to take advantage of the natural plasticity of the grass leaves in order to temporarily re-orient them in a more vertical direction immediately prior to cutting. Changing the orientation of the grass leaves, such as through brushing, increases cutting effectiveness by helping to ensure that grass leaves do not pass below the blades of the cutting reel and thus escape cutting. Mechanically conditioning the grass prior to cutting can, with repeated application, also train the grass leaves in the green to a more upright growth habit.

Existing mechanical means for conditioning the grass prior to cutting are, however, inefficient for their intended purpose, and can introduce "grain" and other problems into the reel mowing process. Existing conditioning means which use rotating dethatching blades provide little "lift" to the grass, because the blades are intended primarily to cut the stolons connecting individual grass plants, rather than re-orient the grass leaves. Existing powered brushes for conditioning the grass prior to cutting, such as the helical brushes offered by Deere & Company, Inc. (One John Deere Place, Moline, Ill. 61265-8098) and The Toro Company, Inc. (8111 Lyndale Avenue South, Bloomington, Minn. 55420-1196), are also inefficient, and their helical design can introduce grain, by "augering" the leaves of the grass preferentially in one direction. If applied aggressively, the "augering" effect of a helical brush design in contact with the turf can even affect the steering of the mower in walk-behind models.

Earlier designs for powered brushes having continuously bristled surfaces were less effective at penetrating the grass canopy, and earlier powered brushes having discrete tufts of long bristles used too few rows of tufts for optimum effectiveness, and the long bristles tended to flex too much and wear out faster. Other techniques, such as the use of separate grooming equipment prior to mowing do not address the compaction of the turf and compression of grass leaves caused by the front roller of the reel mower cutting unit, and a delay between grooming the turf and mowing permits the grass leaves time to relax prior to cutting.

A need therefore exists in the art for an improved powered turf conditioning brush for conditioning the grass prior to cutting that provides increased efficiency, improved lift, and which minimizes the introduction of grain.

SUMMARY OF THE INVENTION

The present invention may be embodied in an improved turf conditioning brush suitable for use with reel mower cutting units, such as those used for precision mowing of golf course greens.

The present invention provides a powered rotary brush that may be mounted on a reel mower cutting unit, transversely to the direction of travel, between the front ground-contacting roller and cutting reel, such as within the groomer drive accessory, and may be configured to be adjustable in elevation above the surface of the turf, in order to vary the amount of contact of the brush with the turf and to permit adjustment for wear of the brush.

Depending upon the condition of the turf, it may be desired to adjust the height of the brush to apply a greater or lesser brushing intensity or "aggressiveness" of turf conditioning prior to cutting, and as described herein, the present invention may be embodied in turf conditioning brushes having different degrees of bristle stiffness suitable for various turf conditions and types of grass, the bristle stiffness being determined primarily by the bristle diameter and the material or materials from which the bristles are made.

A turf conditioning brush constructed according to the present invention has a generally cylindrical base that is configured to rotate by one of several means, including, but not limited to, being configured as a sleeve rotatably mounted on an axle, a sleeve engaging a rotatable spindle, or the base may be constructed integrally to a rotatable spindle. Motive force for the rotation of the sleeve or spindle may be supplied by any of several means, including, but not limited to, indirect means such as a geartrain, a drive belt engaging a pulley, a drive chain engaging a sprocket, or the sleeve or spindle may be directly driven. In a preferred embodiment, the brush base is configured as a sleeve engaging a rotatable spindle. The direction of rotation of the brush base may be the same as that of the cutting reel or opposite to that of the cutting reel, and in a preferred embodiment the rotation of the brush base is opposite to that of the cutting reel, such that the grass-contacting face of the brush is rotating towards the oncoming grass leaves and away from the cutting reel when the reel mower cutting unit is in forward motion.

According to the present invention, a plurality of bristle tufts are attached radially to the brush base in a number of parallel rows along the width of the brush base, with the centers of the bristle tufts in each row spaced equally apart from each other, and the centers of the bristle tufts in each row offset from those in adjacent rows by an offset value that is the ratio of the distance that the bristle tufts in each row are spaced apart divided by an offset factor that is a divisor of the number of parallel rows. In addition to selecting brushes having different degrees of bristle stiffness as described above, the present invention contemplates that brushes constructed according to the present invention having different tuft spacing values and tuft offset values may be selected based upon the turf conditions or type of grass to be mowed.

Having the bristle tufts spaced apart and offset from each other in accordance with the present invention improves brushing efficiency in comparison to a brush having a continuously bristled surface, by enabling the bristle tufts to better penetrate the leaf canopy of the turf. In contrast to a brush having a helical arrangement of tufts, the generally symmetrical arrangement of tufts provided by the present invention does not produce an augering effect that may introduce "grain" into the turf. A turf conditioning brush constructed according to the present invention therefore provides an improved lifting action over the prior art.

These and other objects, features and advantages of the invention will be further described and more readily apparent from a review of the detailed description of the embodiments which follow.

100 Base
110 Notch
120 Bore
200 Tufts
210 Bristles
400 Drive spindle
410 Splines
500 Roller pin

DETAILED DESCRIPTION OF THE INVENTION

As shown in FIGS. 1-6, a plurality of bristle tufts 200 are attached radially to a generally cylindrical brush base 100 in a predetermined number of parallel rows along the width of the brush base 100, with the centers of the bristle tufts 200 in each row spaced equally apart from each other in a symmetrical fashion, and the centers of the bristle tufts 200 in each row offset from those in adjacent rows by an offset value that is the ratio of the distance that the bristle tufts 200 in each row are spaced apart divided by an offset factor that is a divisor of the number of parallel rows.

In contrast with brushes having helical rows of bristle tufts, which produce an undesirable "augering" effect and which can introduce "grain" into a green, brushes having bristle tufts which are mounted radially in parallel rows along the width of the brush base produce a lifting effect that is aligned with the direction of travel of the mower. Considering the "contact patch" of the brush, which is the portion of the brush in contact with the turf at a given time, the parallel rows of bristle tufts encounter the grass canopy straight on, and lift the grass leaves vertically more efficiently than a brush having helical rows of tufts, which encounter the grass canopy at an angle to the direction of travel of the mower; or a dethatching or grooming reel, whose thin metal blades are designed primarily to cut the stolons connecting the individual grass plants, rather than to produce lift. The efficiency of a turf conditioning brush having parallel rows of bristle tufts along the width of the brush base may be further augmented by increasing the absolute "brush frequency" or Fa, defined as the number of times per rotation a given spot in the contact patch of the brush would be touched by a bristle tuft if the brush were rotating but not moving forward. The effective "brush frequency" or Fe, derives from the absolute brush frequency, but takes account of the mower's forward motion. The forward motion of the mower effectively reduces the brush frequency because a given spot in the turf generally will not remain within the contact patch of the brush for very long.

The use of a hybrid drivetrain that permits the rotation speed of the groomer drive and cutting reel to be adjusted independently of the throttle and traction drive can serve to compensate for a lower effective brush frequency to some degree, but providing a brush having a higher absolute brush frequency will benefit both hybrid and non-hybrid driven reel mowers, by allowing the operator to be assured of effective brushing and lift even while mowing at higher speeds of forward travel.

As shown in FIGS. 1-4, the brush base 100 has a predetermined width (designated W) and radius (designated R). The radius R of the brush base is one practical limit of the number of rows (designated N) of bristle tufts on a turf conditioning brush that may be accommodated in the available space within the groomer drive of a reel mower cutting unit. Generally, brush bases having a larger radius R will accommodate a greater number of rows N of bristle tufts 200. Brushes having a larger base radius R are generally desirable because the larger base radius makes possible an increase in N that enables an increased absolute brush frequency, and a larger, and locally flatter, contact patch area which increases the effective brush frequency. In a preferred embodiment, N is equal to 12.

Just as a larger number of helical blades in a cutting reel results in a greater "clip frequency" for the reel, the greater the number of tuft rows N in the brush, the higher the effective "brush frequency" can be for a given rate of brush rotation and mower forward travel. However, brushes which present a contact patch that is a continuously bristled surface are undesirable due to their bristle tufts not being able to effectively penetrate the grass canopy. Spacing between the rows of bristle tufts and between the bristle tufts in the same row is necessary to ensure effective penetration of the canopy and to produce the desired lifting effect that re-orients the grass leaves in a more vertical direction. An offsetting of the bristle tufts in adjacent rows is necessary, because spacing the bristle tufts of adjacent rows in line with each other around the circumference of the brush base would produce gaps where the absolute and effective brush frequency would be zero. Offsetting the centers of the bristle tufts in adjacent rows by an offset value that is the ratio of the tuft spacing distance divided by an offset factor that is a divisor of the number of parallel rows N, produces a contact patch having a uniform absolute brush frequency that is N divided by the offset factor.

Figure 1:
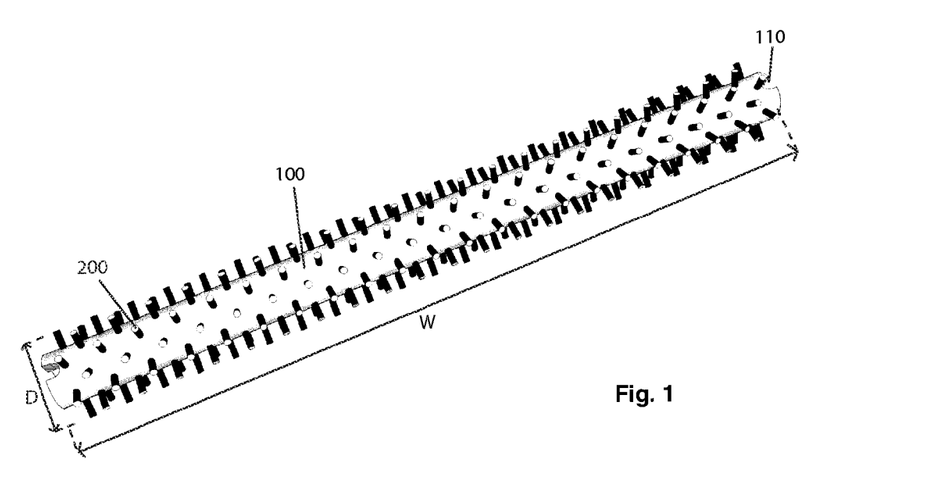
FIG. 1 is a perspective view of a turf conditioning brush according to an embodiment of the invention.
Figure 2:
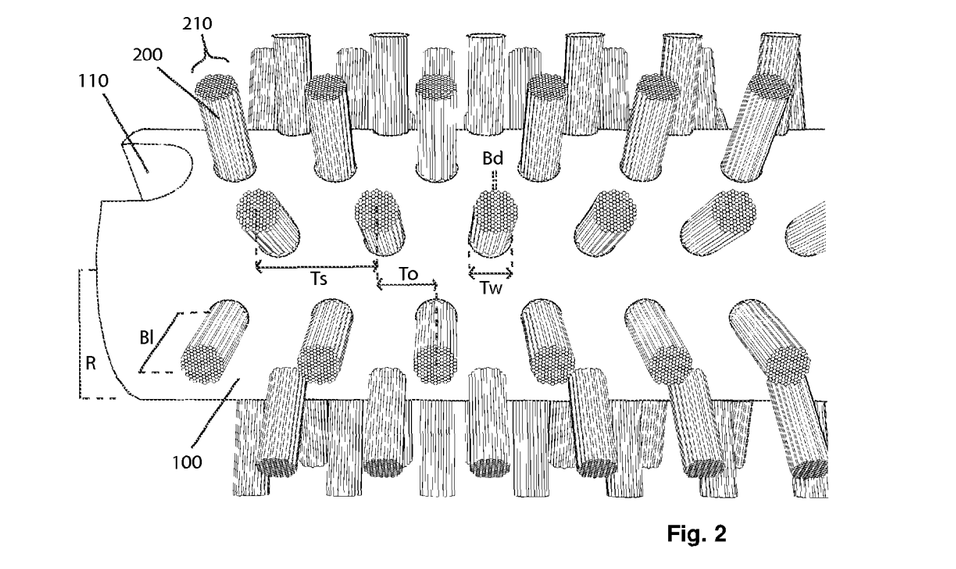
FIG. 2 is a partial detail perspective view of a turf conditioning brush according to an embodiment of the invention, illustrating the tuft pattern.
Figure 3:
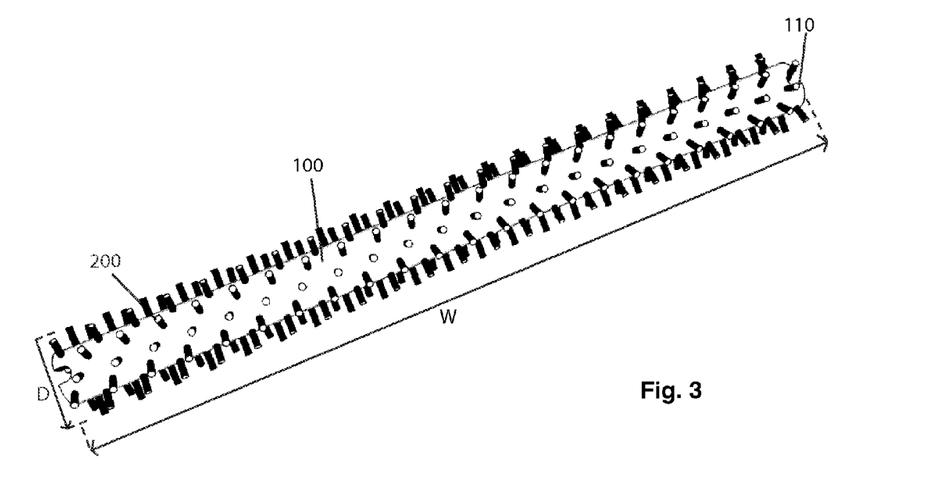
FIG. 3 is a perspective view of a turf conditioning brush according to an embodiment of the invention.
Figure 4:
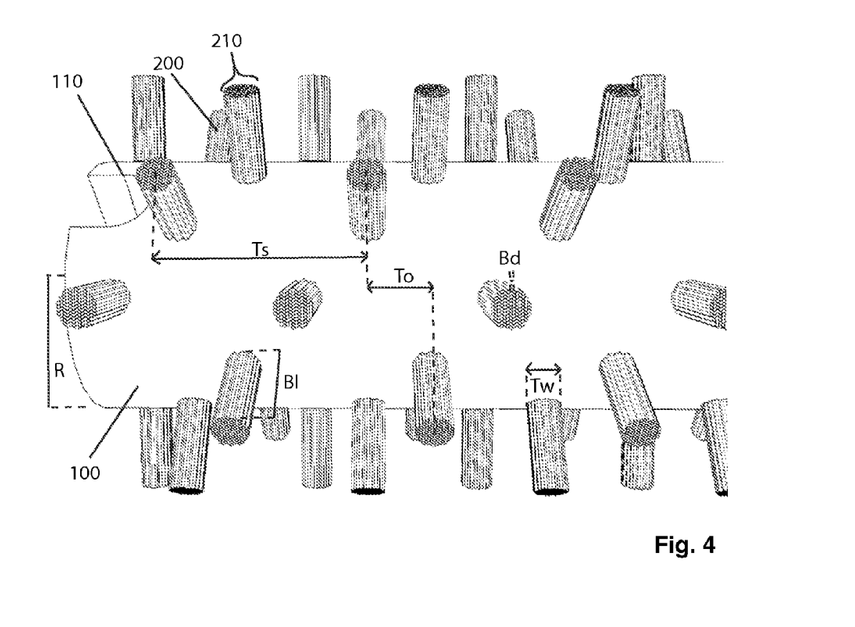
FIG. 4 is a partial detail perspective view of a turf conditioning brush according to an embodiment of the invention, illustrating the tuft pattern.

For example, as illustrated in FIGS. 1 and 2, in a brush having twelve rows of bristle tufts, an absolute brush frequency of six can be achieved with a tuft offset of ½ the tuft spacing distance. As illustrated in FIGS. 3 and 4, another embodiment of the present invention, in a brush having twelve rows of bristle tufts, an absolute brush frequency of four can also be achieved by using a tuft offset that is ⅓ the tuft spacing distance. The slight degree of asymmetry of the tuft pattern that results from using a tuft offset factor of three rather than two does not produce appreciable "grain." For a brush having fifteen rows of bristle tufts, an offset factor of three would make it possible to achieve an absolute brush frequency of five, though the implementation of brushes with fifteen rows, or even larger values of N, will likely require redesign of the groomer drive accessory of existing reel mowers to accommodate brushes having an increased base radius.

Figure 6:
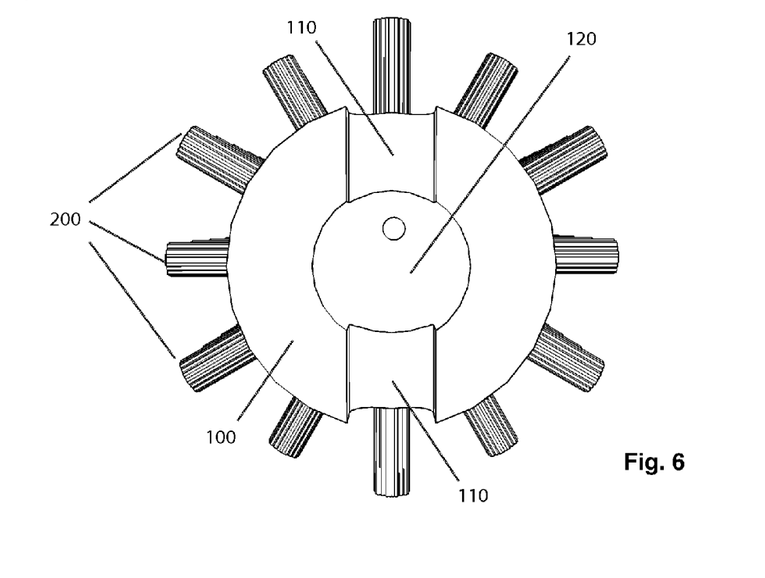
FIG. 6 is a detail perspective view of one end of a turf conditioning brush according to an embodiment of the invention.

In accordance with the present invention, N must be a value between 8 and 16, and the rows of bristle tufts 200 are arranged radially around the brush base 100 at an angle of 360/N degrees relative to each other, as depicted in FIG. 6. The brush base 100 may be made of any suitable strong, rigid material, such as plastic, metal, or composite materials, and in a preferred embodiment is made of acrylonitrile butadiene styrene (ABS) plastic.

As shown in detail in FIGS. 2 and 4, each bristle tuft 200 comprises a plurality of bristles 210, with each bristle 210 having a predetermined length (designated Bl) and diameter (Bd), with the length Bl defined as the length of the bristle extending above the brush base 100. Both Bl and Bd may be varied as desired to achieve a predetermined stiffness of the bristle tufts 200. In accordance with the present invention, Bl is no greater than ⅔ of the base radius R. Short bristles relative to the base radius are desirable because they flex less than longer bristles, and tend to wear less quickly. In a preferred embodiment, Bl is approximately one half inch (½"), with Bd having a value between 0.01 and 0.025 inches. The bristles 210 may be made of any suitable pliable material, such as plastic, metal, or natural fibers, and in a preferred embodiment are made of nylon. The bristles 210 may be attached to the brush base 100 by any suitable method, such as thermoplastic welding, mechanical fasteners, or adhesives, and in a preferred embodiment are attached with mechanical fasteners.

The total brush diameter (designated D), shown in FIGS. 1 and 3, as measured bristle tip to bristle tip, is two times the sum of the base radius R and the bristle length, or D=2(R+Bl). The values of D and W are limited by the particular mounting location of the brush, and may vary between different reel mower cutting units.

As shown in FIGS. 2 and 4, each bristle tuft 200 has a predetermined width, (designated Tw). Tufts having a greater width can generally accommodate more bristles 210 for a given value of Bd, and conversely, for a given value of Tw, there will be correspondingly fewer bristles 210 in the tuft as Bd increases. In a preferred embodiment, the bristle tufts 200 are generally cylindrical, and have a diameter corresponding to a Tw of approximately 3/16 of an inch.

As shown in FIGS. 2 and 4, the centers of the bristle tufts within each row are spaced equally apart in a symmetrical fashion along the width of the brush base by a predetermined tuft spacing distance (Ts) no less than one and one half times (1½.times.) the tuft width Tw. In the embodiment illustrated in FIGS. 1 and 2, Ts is one half inch (½"), and in the embodiment illustrated in FIGS. 3 and 4, Ts is one inch (1").

According to the present invention, and as shown in FIGS. 2 and 4, the bristle tufts 200 in each row are offset relative to those in adjacent rows by a tuft offset value (To) that is the ratio of the distance that the bristle tufts 200 in each row are spaced apart divided by an offset factor that is a divisor of the number of parallel rows. In the embodiment illustrated in FIGS. 1 and 2, To is equal to one quarter inch (¼"), and in the embodiment illustrated in FIGS. 3 and 4, To is equal to one third inch (⅓"). In accordance with the present invention, the value of To is selected to be no greater than two times the tuft width (2*Tw), and the values of Ts and To are selected to ensure a uniform absolute brush frequency Fa across the contact patch of the brush, taking into account the broadening of the width of the bristle tufts when in contact with a surface.

Figure 5:
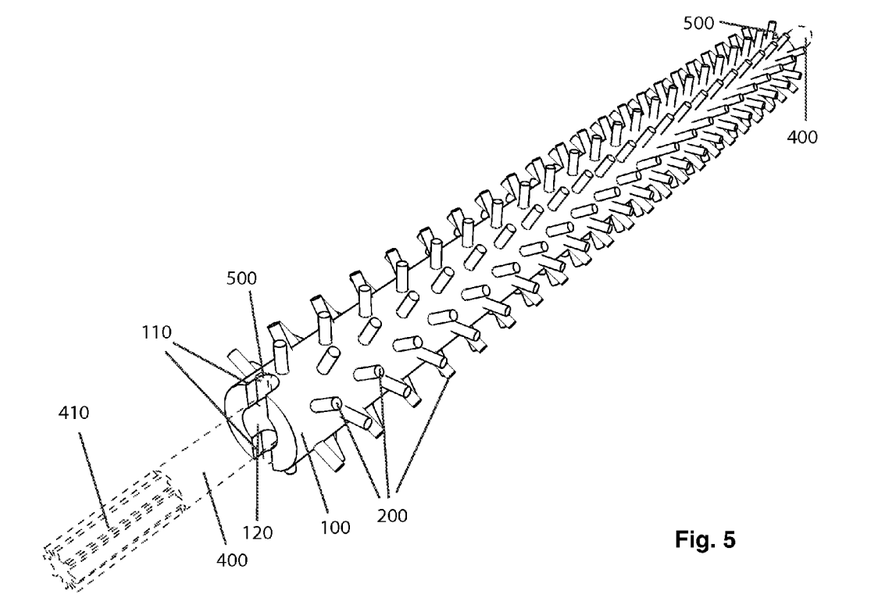
FIG. 5 is a perspective view of a turf conditioning brush according to an embodiment of the invention, showing the brush mounted to a drive spindle.

As shown in FIG. 5, the present invention may be embodied in a brush sleeve engaging a rotatable drive spindle 400. In this embodiment, the brush base 100 may be formed as a hollow tube having a bore 120 configured for receiving a drive spindle 400, and notches 110 at both ends of the brush base 100 configured for engaging roller pins 500 inserted through the drive spindle 400. The roller pins 500 serve to position the brush base 100 on the drive spindle 400, and in cooperation with the notches 110 in the brush base 100, transfer the rotational force from the drive spindle 400 to the brush base 100 and its attached bristle tufts 200. The rotational force may be applied to the drive spindle 400 through splines 410, or other suitable means.

Figure 7:
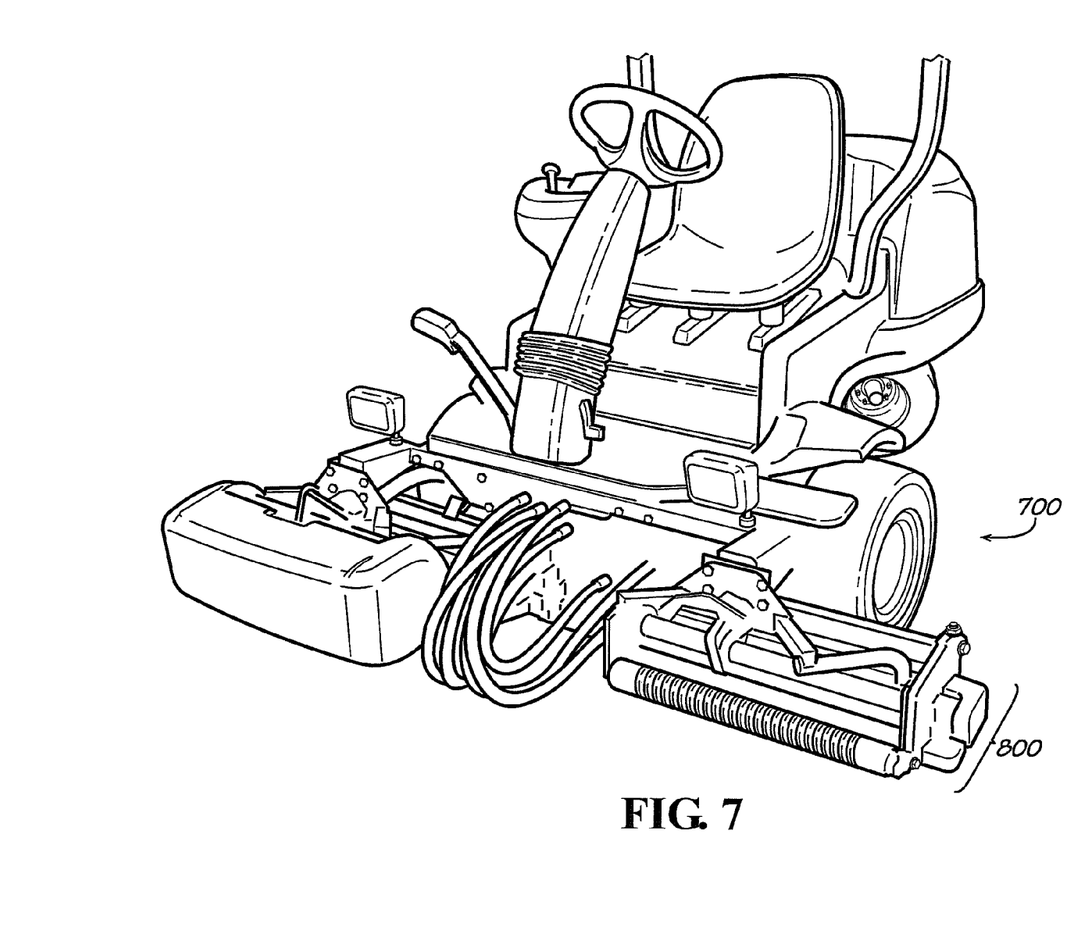
FIG. 7 is a perspective view of a ride-on reel mower.
Figure 8:
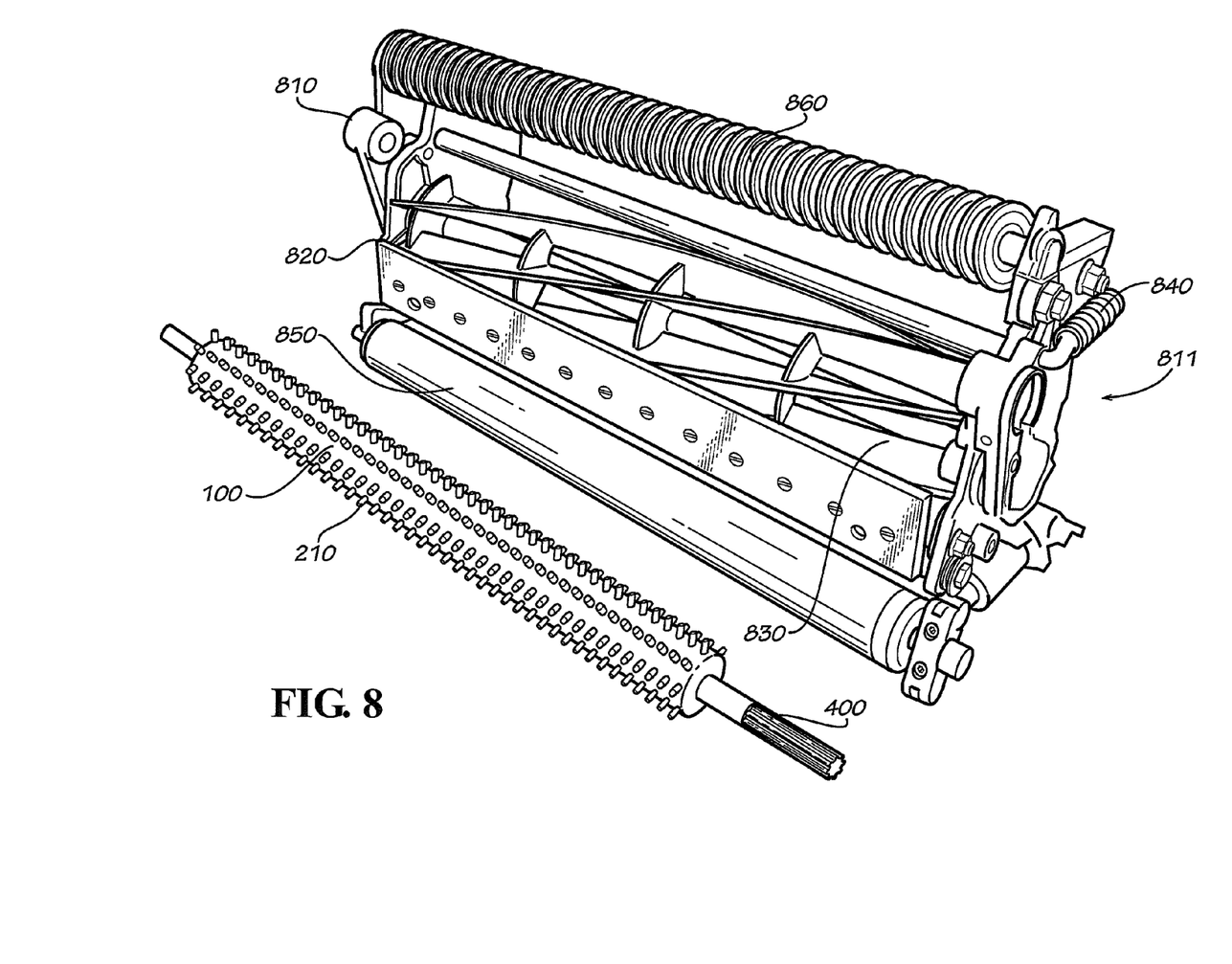
FIG. 8 is a partially exploded view of a turf conditioning brush and a reel mower cutting unit.
Figure 9:
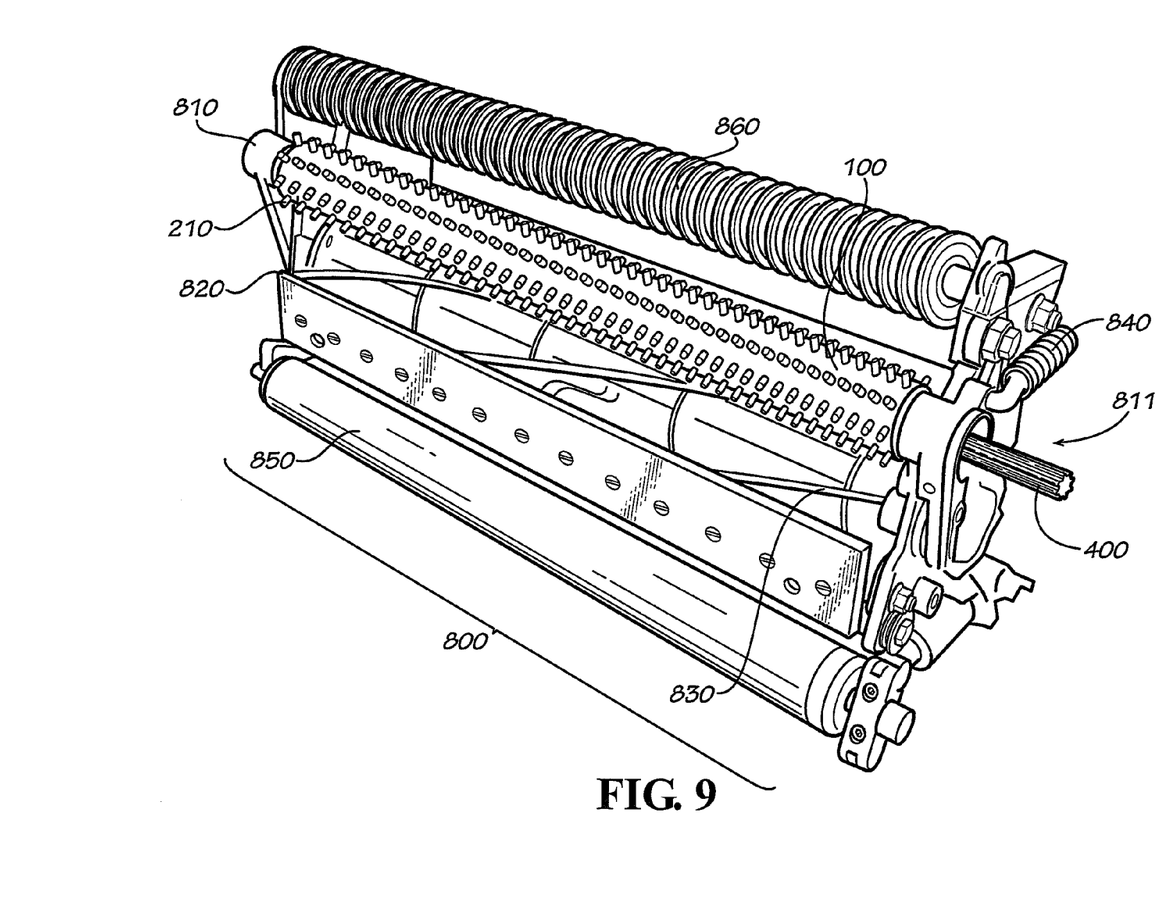
FIG. 9 is a perspective view of a turf conditioning brush and a reel mower cutting unit, where the turf conditioning brush is mounted within the groomer drive accessory of the reel mower cutting unit.

As shown in FIGS. 7-9, the design of a modern reel mower 700 cutting unit 800 utilizes a powered reel of several helical blades 830 which rotate in close contact with a fixed bedknife 820 to clip the grass leaves to a uniform height in a scissor like fashion. This cutting unit 800 is generally housed in an assembly, which is generally shown in FIGS. 8-9, known as a groomer drive accessory 810 having a groomer drive gear and mounting bracket 811. The number of blades in a cutting reel 830 varies, with more blades providing a greater "clip frequency" over a given distance of the reel mower 700 cutting unit's 800 forward travel. The cutting reel 830 and bedknife 820 are generally mounted between two ground-contacting rollers 850 and 860 in a frame that permits the height of cut to be adjusted precisely. In walk-behind reel mowers 700, the rear roller 850, also called the traction roller, is powered, and the front roller 860 is generally used to adjust the cutting height. In current walk-behind designs, the cutting reel 830 is either mechanically linked to the engine and drivetrain powering the rear traction roller 850, or is powered by an electric motor which permits the clip frequency of the cutting reel 830 to be set independent of the engine's throttle setting and speed of ground travel, an arrangement termed a "hybrid" drive. In ride-on reel mowers 700, one or more powered helical reel cutting units 800 is pushed or pulled across the grass surface by a tractor, with each cutting unit 800 mounted on its own ground-contacting rollers 850 and/or 860 in a manner that permits the cutting units 800 to individually adjust to the contours of the ground. Hybrid drive systems are also available for the cutting units 800 of ride-on reel mowers 700. Depending upon the condition of the turf, it may be desired to adjust the height of the brush to apply a greater or lesser brushing intensity or "aggressiveness" of turf conditioning prior to cutting, and as described herein, the present invention may be embodied in turf conditioning brushes having different degrees of bristle stiffness suitable for various turf conditions and types of grass, the bristle stiffness being determined primarily by the bristle diameter and the material or materials from which the bristles are made. A turf conditioning brush constructed according to the present invention has a generally cylindrical base 100 that is configured to rotate by one of several means, including, but not limited to, being configured as a sleeve rotatably mounted on an axle, a sleeve engaging a rotatable spindle 400, or the base may be constructed integrally to a rotatable spindle 400. In a preferred embodiment, the turf conditioning brush is mounted on a drive spindle 400 and the motive force for the rotation of the turf conditioning brush may be supplied by any of several means, including, but not limited to, indirect means such as a geartrain, a drive belt engaging a pulley, a drive chain engaging a sprocket, or the sleeve or spindle 400 may be directly driven. In a preferred embodiment, the brush base 100 is configured as a sleeve engaging a rotatable spindle 400. The direction of rotation of the brush base 100 may be the same as that of the cutting reel 830 or opposite to that of the cutting reel 830, and in a preferred embodiment the rotation of the brush base 100 is opposite to that of the cutting reel 830, such that the grass-contacting face of the brush is rotating towards the oncoming grass leaves and away from the cutting reel 830 when the reel mower 700 cutting unit 800 is in forward motion.

In this embodiment of the invention, shown in a detailed end-on perspective in FIG. 6, the bore 120 extends through the entire width of the brush base 100, and the notches 110 in the end of the brush base are similarly configured at both ends of the brush base 100. A predetermined number of linear rows N of bristle tufts 200 are arranged radially around the brush base 100. In a preferred embodiment, the number of rows N of bristle tufts is equal to 12.

Although the invention has been shown and described with reference to certain specific presently preferred embodiments, the given embodiments should not be construed as limitations on the scope of the invention, but as illustrative examples, and those skilled in the art to which this invention pertains will undoubtedly find alternative embodiments obvious after reading this disclosure. With this in mind, the following claims are intended to define the scope of protection to be afforded the inventor, and these claims shall be deemed to include equivalent constructions insofar as they do not depart from the spirit and scope of the present invention.

I claim:

1. A powered turf conditioning brush comprising:
   a generally cylindrical brush base configured to be powered by and mounted within a groomer drive accessory of a reel mower cutting unit, where the reel mower cutting unit comprises a front roller, a rear roller, a cutting reel, a bedknife and a groomer drive accessory where the groomer drive accessory resides between the front roller and the cutting reel, said generally cylindrical brush base having a predetermined base radius and a predetermined base width;
   a plurality of bristle tufts mounted radially in a predetermined number of parallel rows along the width of said generally cylindrical brush base, said predetermined number of parallel rows being no less than 8 and no greater than 16; whereby when powered by the groomer drive accessory, the bristle tufts of the brush contacts the turf in an orientation that creates a substantially uniform vertical lifting of the turf in order to more effectively facilitate cutting by the cutting reel;
   each bristle tufts comprising a plurality of bristles, each of said bristles having a predetermined bristle length and predetermined bristle diameter, whereby said bristle length and bristle diameter contribute to the relative stiffness of the bristle tufts and each of said plurality of bristle tufts configured to be spaced equally apart from adjacent bristle tufts in its own row by a predetermined tuft spacing value and configured to be offset from bristle tufts in adjacent rows by a predetermined tuft offset value, said tuft offset value being the ratio of said predetermined tuft spacing value divided by an offset factor, the offset factor being an integer no less than 2 and no greater than 4; whereby the turf spacing value and turf offset value facilitate bristle penetration into the turf by optimizing the frequency of contact between the bristle tufts and the turf.

2. The powered turf conditioning brush of claim 1, wherein the predetermined bristle length is no greater than two thirds of the base radius of said generally cylindrical brush base.

3. The powered turf conditioning brush of claim 2, wherein the predetermined number of parallel rows of bristle tufts along the width of the brush base is 12, and the offset factor is 3.

4. The powered turf conditioning brush of claim 2, wherein the predetermined number of parallel rows of bristle tufts along the width of the brush base is 12, and the offset factor is 4.

5. The powered turf conditioning brush of claim 2, wherein the predetermined number of parallel rows of bristle tufts along the width of the brush base is 15, and the offset factor is 3.

6. The powered turf conditioning brush of claim 1, wherein the predetermined number of parallel rows of bristle tufts along the width of the brush base is 8, and the offset factor is 2.

7. The powered turf conditioning brush of claim 1, wherein the predetermined number of parallel rows of bristle tufts along the width of the brush base is 10, and the offset factor is 2.

8. The powered turf conditioning brush of claim 1, wherein the predetermined number of parallel rows of bristle tufts along the width of the brush base is 12, and the offset factor is 2.

9. The powered turf conditioning brush of claim 1, wherein the predetermined number of parallel rows of bristle tufts along the width of the brush base is 12, and the offset factor is 3.

10. The powered turf conditioning brush of claim 1, wherein the predetermined number of parallel rows of bristle tufts along the width of the brush base is 12, and the offset factor is 4.

11. The powered turf conditioning brush of claim 1, wherein the predetermined number of parallel rows of bristle tufts along the width of the brush base is 15, and the offset factor is 3.

12. The powered turf conditioning brush of claim 1, wherein the predetermined number of parallel rows of bristle tufts along the width of the brush base is 8, and the offset factor is 2.

13. The powered turf conditioning brush of claim 1, wherein the predetermined number of parallel rows of bristle tufts along the width of the brush base is 10, and the offset factor is 2.

14. The powered turf conditioning brush of claim 1, wherein the predetermined number of parallel rows of bristle tufts along the width of the brush base is 12, and the offset factor is 2.

15. A method for mowing turf using a powered turf conditioning brush to condition the turf while mowing, the method comprising:

providing a turf conditioning brush having a generally cylindrical brush base configured to be powered by and mounted within the groomer drive accessory of a reel mower cutting unit, where the reel mower cutting unit comprises a front roller, a rear roller, a cutting reel, a bedknife and a groomer drive accessory where the groomer drive accessory resides between the front roller and the cutting reel, said generally cylindrical brush base having a predetermined base radius and a predetermined base width, and a plurality of bristle tufts mounted radially in a predetermined number of parallel rows along the width of said generally cylindrical brush base, said predetermined number of parallel rows being no less than 8 and no greater than 16; whereby when powered by the groomer drive accessory, the bristle tufts of the brush contacts the turf in an orientation that creates a uniform vertical lifting of the turf in order to more effectively facilitate cutting by the cutting reel and wherein each bristle tuft comprises a plurality of bristles, each of said bristles having a predetermined bristle length and predetermined bristle diameter that contribute to the relative stiffness of the bristle tufts; and wherein each of said plurality of bristle tufts is configured to be spaced equally apart from adjacent bristle tufts in its own row by a predetermined tuft spacing value and configured to be offset from bristle tufts in adjacent rows by a predetermined tuft offset value, said tuft offset value being the ratio of said predetermined tuft spacing value divided by an offset factor, the offset factor being an integer no less than 2 and no greater than 4 whereby the turf spacing value and turf offset value facilitate bristle penetration into the turf by optimizing the frequency of contact between the bristle tufts and the turf;

mounting said turf conditioning brush within the groomer drive accessory of a reel mower cutting unit and configuring said conditioning brush to be driven by said groomer drive accessory;

adjusting the elevation of said turf conditioning brush to a predetermined height above ground level of the turf to be mowed and below the height of the upper surface of the turf;

placing said reel mower cutting unit upon the turf to be mowed, with said turf conditioning brush in contact with the turf;

engaging said reel mower cutting unit to drive said turf conditioning brush; and mowing the turf with said reel mower cutting unit.

16. The method of claim 15, wherein the bristles comprising each of the plurality of bristle tufts of the turf conditioning brush provided have a predetermined bristle length no greater than two thirds of the base radius of the generally cylindrical brush base.

17. The method of claim 16, further comprising the initial steps of identifying the predominate grass species present in the turf to be mowed; and selecting a turf conditioning brush to be provided wherein the bristle diameter of each of the bristles comprising the plurality of bristle tufts of said turf conditioning brush is determined based upon the identified predominate grass species present in the turf to be mowed.

18. The method of claim 17, wherein the tuft spacing value and tuft offset value of the turf conditioning brush to be provided are determined based upon the identified predominate grass species present in the turf to be mowed.

19. The method of claim 15, further comprising the initial steps of identifying the predominate grass species present in the turf to be mowed; and selecting a turf conditioning brush to be provided wherein the bristle diameter of each of the bristles comprising the plurality of bristle tufts of said turf conditioning brush is determined based upon the identified predominate grass species present in the turf to be mowed.

20. The method of claim 19, wherein the tuft spacing value and tuft offset value of the turf conditioning brush to be provided are determined based upon the identified predominate grass species present in the turf to be mowed.

* * * * *